Patented Oct. 19, 1948

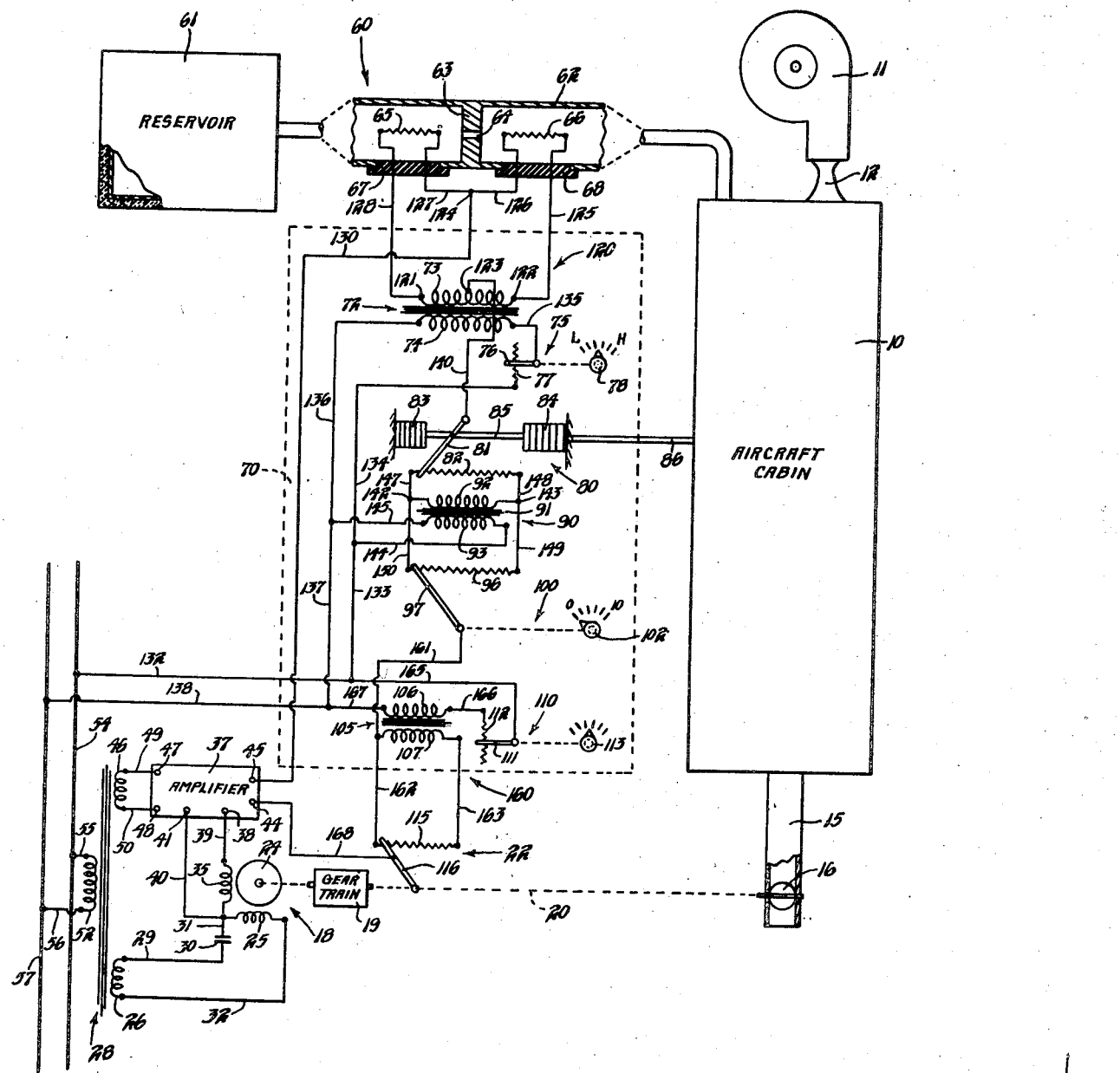

2,451,608

UNITED STATES PATENT OFFICE 2,451,608

CABIN PRESSURE CONTROL MEANS

George L. Borell, Minneapolis, Minn., assignor to Minneapolis-Honeywell Regulator Company, Minneapolis, Minn., a corporation of Delaware Application October 30, 1944, Serial No. 561,070

9 Claims. (Cl. 98—1.5)

The present invention relates to the art of pressurizing aircraft cabins.

The pressurizing of aircraft cabins, as now practiced, and due to limitations of the aircraft structures, must take into account the pressures and rate of change of pressure which can be comfortably tolerated by the passengers of said craft. The present disclosure is concerned with means for controlling the cabin pressure and for controlling the rate of change of pressure of same within desired limits. The average human being can stand, without appreciable discomfort, a fairly wide variation in air pressure. For instance, it has been determined that the air pressure in the cabin can be varied from about 29.92 inches of Hg, corresponding to sea level elevation, to about 20.6 inches of Hg, corresponding to an altitude of about 10,000 feet. However, this variation in altitude is possible only if the rate of change of pressure is kept within certain limits. The rate of change of pressure is sufficiently important that the regulations governing commercial air transport specify limiting values of pressure change which must not be exceeded.

It is therefore a principal object of this invention to provide apparatus for controlling the air pressure within the cabin of an aircraft and to control the rate of change of said pressure.

It is a further object to provide apparatus for control of cabin pressurizing which is relatively simple and easy to construct, yet dependable and accurate in its controlling function.

In prior devices of the present sort, it has been difficult to provide apparatus which is inherently most accurate under those conditions wherein accuracy is most needed. For instance, as human beings are increasingly susceptible to pressure change as the rate of change is increased, it is desirable that the pressure control apparatus be of greater sensitivity and control to closer limits with a relatively high rate of change. It is therefore an object of this invention to provide control apparatus of inherently greater sensitivity as the rate of change of pressure is increased.

It is an object of the present invention to provide electrical apparatus for control of cabin pressurizing wherein the various electrical components are similar to other electrical apparatus used in the aircraft, to thus simplify maintenance and the like.

It is a further object to provide apparatus for control of cabin pressurizing wherein there is a minimum of moving parts, thereby rendering the present apparatus less susceptible to vibration than purely mechanical devices.

It is a further object to provide a cabin pressure control apparatus wherein the only special devices needed are extremely simple and easy to manufacture.

It is an object to control pressure and the rate of change of cabin pressure in an aircraft cabin provided with a suitable source of compressed air by controllably throttling the cabin air outlet.

It is also an object to provide control means responsive to air flow between the cabin and an air reservoir for coacting with other control apparatus in a manner to oppose cabin pressure change.

It is an additional object to provide hot wire means responsive to air flow between the cabin and an air reservoir wherein the hot wire means is connected into the cabin pressure control apparatus in a manner to resist change in cabin pressure.

It is a further object to provide means for varying cabin pressure at an adjustable and varying rate so that the rate of change of pressure decreases as a desired pressure is approached.

These and other objects will become apparent upon a study of the present drawings and specification.

The single figure of the drawing is a schematic representation of the present control apparatus.

In the figure, aircraft cabin 10 is supplied air from compressor 11 through Venturi restricting means 12. Compressor 11 may be of any suitable sort such as a motor driven centrifugal compressor, or it may be one of the turbo superchargers associated with an aircraft engine and supplying air to both said engine and said cabin. Venturi means 12 is provided to limit the maximum flow of air into said cabin so that the actual control of cabin pressure may be effected by controlling the exhaust of the air from the cabin, as will be described. It is contemplated that compressor 11 will always furnish sufficient air for said cabin at a pressure exceeding that desired in the cabin. Reference is made to copending application of Hubert T. Sparrow, filed June 22, 1944, Serial No. 541,520, which shows means for supplying air for an aircraft cabin through a Venturi flow limiting means and wherein means are provided to insure that the discharge pressure of the supercharger will always be suitably high for cabin pressurizing. The means for supplying air to the cabin forms no part of the present invention and therefore has not been more fully described in this disclosure.

As before noted, pressure in the cabin 10 is controlled by the means permitting the exhausting of air from the cabin. Air is exhausted from cabin 10 through conduit 15 controlled by butterfly valve 16. A wide open position of valve 16 permits cabin pressure to approach that of the surrounding atmosphere whereas closing of said valve permits the cabin pressure to be raised above that of said atmosphere. Valve 16 is adjusted by means of reversible 2-phase motor 18 operating through gear train 19, said gear train 19 driving said valve by shaft 20. In addition, shaft 20 also controls the operation of follow-up potentiometer 22.

The operation of motor 18 is dependent upon the furnishing of current to one of its windings of a phase different from that furnished the other of its windings. Winding 25 of said motor is supplied with current from secondary winding 26 of transformer 28 by the circuit: secondary 26, wire 29, condenser 30, wire 31, winding 25, and wire 32 back to said secondary winding 26. Winding 35 of said motor is energized by the circuit: terminal 38 of an amplifier 37, wire 39, winding 35, and wire 40 to terminal 41 of said amplifier. The direction of rotation of armature 24 of motor 18 depends upon whether the phase of the current supplied winding 35 lags or leads that supplied winding 25. If the current supplied winding 35 leads that supplied winding 25, armature 24 rotates in one direction whereas, if the current supplied winding 35 lags that supplied winding 25, the rotation of armature 24 is in the opposite direction. If the phase of the current supplied winding 35 is the same as that supplied 25, or if no current is furnished winding 35, armature 24 does not rotate.

Amplifier 37 is of a sort which maintains the phase relation of the electrical signals supplied to it. It therefore follows that the phase of the current supplied winding 35 of motor 18 depends upon the phase of the signal potential supplied to amplifier 37. Any amplifier which will maintain the phase relation of its output current substantially identical with that of its input signal may be used, but I prefer to use an amplifier such as that disclosed in the copending application of Albert P. Upton, Serial No. 437,561, filed April 3, 1942. Amplifier 37 receives its input signal through terminals 44 and 45, and receives its power supply through terminals 46 and 47 by the circuit: secondary winding 46 of transformer 28, wire 49, terminal 47 of transformer 37, terminal 48, and wire 50, back to said secondary winding 46.

Transformer 28 includes a primary winding 52 which is energized from the current supply of the aircraft by the circuit: line 54, wire 55, primary winding 52, wire 56, and line 57.

Signal potentials are supplied to amplifier 37 for control of motor 18 by apparatus including change of pressure sensing means 60, the apparatus of control panel 70, and follow-up potentiometer 22. The change of pressure sensing means 60 comprises a suitable, and preferably insulated, receptacle or reservoir 61 connected by conduit means 62 to aircraft cabin 10. Restrictor means 63 including a nozzle-like orifice 64 is located within conduit 62. Whenever the cabin pressure exceeds that existing in reservoir 61, the air tends to flow from the cabin to said reservoir through orifice 64, and when the cabin pressure is lower than that in 61, the direction of flow is in reverse direction. Further, the rate of flow through the orifice is dependent on the pressure differential existing between the cabin and the reservoir. To detect the direction and the rate of the flow, if any, through conduit 62, impedances such as resistors 65 and 66, heated by electric current flowing therethrough, are arranged on either side of restrictor 63 and in substantial alignment with orifice 64, said resistors being mounted in conduit 62 by insulated plugs 67 and 68, respectively. Resistors 65 and 66 are constructed of suitable material, such as nickel, having a high temperature coefficient of resistance. With resistors 65 and 66 arranged as described, it is noted that the airflow downstream of orifice 64 is better defined than that upstream of said orifice. The downstream resistor is thus subject to a greater change of temperature by airflow through said orifice than is the upstream resistor.

Control panel 70 includes transformer 72 having an intermediate tapped secondary winding 73 and primary winding 74. A rate control means 75 comprises a arm 76 adjustable over resistor 77 by knob 78 and controls the current supply to primary winding 74 in a manner to be described. Pressure responsive means 80 is provided to operate wiper 81 over an impedance such as resistor 82 in response to changes of pressure in cabin 10. Pressure responsive device 80 comprises a pair of opposed bellows 84 and 83 acting through connecting link 85. Bellows 84 is connected to cabin 10 by tube 86 and contracts or expands in response to the pressure existing in said cabin. Bellows 83 is evacuated and includes an internal spring to cause expansion of same. Bellows 83 tends to contract upon high atmospheric pressure and to expand with low atmospheric pressure. This bellows is provided in opposition to bellows 84 so that the effect of varying atmospheric pressure upon the device 80 will be neutralized and so that device 80 will operate wiper 81 in response to the absolute pressure existing in cabin 10.

Resistor 82 forms a part of an electrical network 90 supplied with current by a transformer 91 having a secondary winding 92 and a primary winding 93. An additional impedance, resistor 96, swept over by wiper 97 forms another portion of said network 90. For convenience, the means for adjusting wiper 97 will be considered altitude selector 100 and comprises knob 102 and suitable connecting means for positioning wiper 97. Control panel 70 also includes transformer 105 having a primary winding 106 and a secondary winding 107. The current supplied to primary winding 106 is adjustable by ratio control means 110 comprising an arm 111 movable over resistor 112 by adjusting knob 113. Secondary winding 107 of transformer 105 is used to provide a potential across an impedance such as resistor 115 of follow-up potentiometer 22.

It is now noted that the change of pressure responsive means 60, control apparatus 70, and follow-up potentiometer 22 comprise a compound electrical network. Said network is connected to input terminals 44 and 45 of amplifier 37 and is thus seen to be the means for supplying input signals to said amplifier. The compound network includes a network circuit 120 having input terminals 121 and 122 and having output terminals 123 and 124. It is now noted that the upper left-hand branch of network 120 includes wire 127, resistor 65, and wire 128. The lower left-hand branch of said network comprises the left-hand half of secondary winding 73 of transformer 72. The lower right-hand branch comprises the right-hand half of the transformer secondary winding 73; and the upper right-hand branch of said circuit comprises wire 125, resistor 66, and wire 126. Output terminal 124 is connected by wire 130 to terminal 45 of said amplifier 37. It is noted that the network circuit 120 is energized from transformer 72, the primary winding 74 of same being supplied with current by the following circuit: line 54, wire 132, wire 133, wire 134, resistor 77, wiper 76, wire 135, primary winding 74, wire 136, wire 137, wire 138, and line 57. The center tap or output terminal 123 of secondary winding 73 is connected by wire 140 to wiper 81.

Wipers 81 and 97 comprise the output terminals of a network circuit 90. Input terminals 142 and 143 are supplied current by secondary winding 92 of transformer 91. Primary winding 93 of transformer 91 is energized by the circuit: line 54, wire 132, wire 133, wire 144, secondary winding 93, wire 145, wire 137, wire 138, and line 57. The branches of network 90 are; first, reading from input terminal 142, wire 147, and the portion of resistor 82 to the left of wiper 81; second, the portion of resistor 82 lying to the right of wiper 81 and wire 148 to input terminal 143; third, wire 149 and the portion of resistor 96 lying to the right of wiper 97; and fourth, the portion of resistor 96 lying to the left of wiper 97 and wire 150 back to input terminal 142.

Wiper 97 is connected to the left end of transformer secondary 107 of follow-up network 160 by wire 161. Follow-up network 160 comprises secondary winding 107 of transformer 105 and follow-up potentiometer 22, resistor 115 of said potentiometer 22 being connected to said secondary winding 107 by wires 162 and 163. Primary winding 106 of transformer 105 is energized by the circuit: line 54, wire 132, wire 165, wiper 111, resistor 112, wire 166, primary winding 106, wire 167, wire 138 and line 57. Wiper 116 of follow-up potentiometer 22, which is adjustable over resistor 115 in response to valve operation, is connected by wire 168 to input terminal 44 of amplifier 37. As will be made clear in the following description of the operation of the present apparatus, it is noted that the presence of signals and the phase relation of same at the input terminals of amplifier 37 are dependent upon the conditions of balance of network 120, network 90, and network 160.

Operation

The relation and function of the above described apparatus will now be made more clear by reciting its operation under varying conditions. In this connection, it is necessary that certain assumptions be made to give a suitable basis for an analysis of the compound network. Obviously, the values given are suggestive only and are not to be considered in a limiting sense.

Although it is obvious from inspection that the present control components are energized by alternating current, and it has been stated that the direction of operation of motor 18 depends upon the phase relation of the signals supplied amplifier 37, the present compound network may be more readily understood if considered on a basis of the voltage relations existing during the instant of a half cycle. Because a voltage which is negative at one half cycle instant is positive at the next half cycle instant, it is seen that the consideration of positive and negative in the present description actually relates to a difference in phase. Each of networks 120, 90, and 160 are energized in similar phase relation. Assuming that the left-hand side of each of said networks is negative and the right-hand side is positive, it is seen that movement of wiper 116 to the right across resistor 115 adds a negative signal to the compound network. When wiper 97 of network 90 is farther to the right than wiper 81, negative signals are added by said network 90. However, when wiper 81 is farther to the right than wiper 97, positive signals are added to the compound network. When resistor 66 is the downstream and cooler resistor, network 120 is unbalanced to add positive signals to the compound network, and when resistor 65 is the downstream and cooler resistor, negative signals are added to the network.

In this description of operation, a condition of network unbalance referred to as providing a positive signal means that the upper terminal of the network is positive relative to the bottom terminal and, of course, a negative signal would be that in which the upper terminal is negative relative to the bottom terminal.

It is noted that the rate control 75 is adjusted to provide an intermediate voltage to primary winding 74 of transformer 72. With this adjustment, wherein knob 78 is set for a moderate rate of cabin pressure change, network 120 is energized with a current such that the aforesaid rate of change of pressure existing between reservoir 61 and cabin 10 will cause sufficient cooling effect on resistor 65 or 66 to unbalance said network 120 about 12 volts, for instance. As shown, if the cabin pressure decreases at said moderate rate, the signal would be 12 volts positive, whereas, if the cabin pressure be increased at said rate, the signal would be 12 volts negative. If knob 78 be turned to permit a high rate of change, it is noted that more of the resistance 77 would be in the circuit of primary 74 and the network 120 would operate at a lower voltage. The corresponding reduction in current flowing through resistors 65 and 66 of same would cause them to operate at lower temperature, thereby requiring a greater flow of air to cause the same voltage unbalance. However, if knob 78 be turned the other way to permit a low rate of change, resistors 65 and 66 of network 120 would be operated at their maximum temperature and therefore would be more responsive to air flow through orifice 64. Moreover, the voltage across input terminals 121 and 122 is greater so that the same relative change in temperature of element 65 and 66 will produce a greater unbalance voltage.

Cabin pressure responsive means 80 is so constructed that it maintains wiper 81 at the left-hand side of resistor 82 when cabin pressure is at sea level, and adjusts said wiper 81 to the right-hand extreme of resistor 82 when cabin pressure has risen to a value corresponding to 10,000 feet of elevation.

Altitude selector 100 is shown with knob 102 adjusted to zero, corresponding to sea level altitude, and wiper 97 is at the extreme left of resistor 96. When knob 102 is turned to the right of its scale, corresponding to 10,000 feet altitude, wiper 97 will be adjusted to the right-hand extreme of resistor 96. A potential of 8 volts, for example, is impressed on network 90 by transformer 91.

Ratio control 110 is adjusted to an intermediate value wherein a potential of, say, 6 volts, is impressed across resistor 115. By varying the voltage impressed across resistor 115, ratio control 110 determines the amount of movement required by valve 16 and follow-up potentiometer wiper 116 to rebalance a given unbalance of the rest of the network. It has been noted that a "positive" signal from a network means that the upper terminal is positive with regard to the lower terminal.

Further, when terminal 45 of amplifier 37 is positive relative to terminal 44, motor 18 is operated to close valve 16. It is now noted that a closing movement of the valve also moves wiper 116 in a direction to cause a balancing negative signal from network 160. Because of the series connection of networks 160, 90, and 120, the voltage signals from each of the networks is algebraically added to obtain the value of the voltage signal impressed on terminals 44 and 45 of the amplifier. Thus a positive signal from one network may be offset or balanced out by an equally large negative signal. As either a positive or negative signal from the compound network impressed on terminals 44 and 45 will cause operation of motor 18, the motor can be stopped only by reducing the said compound network signal to zero or by reaching an end position. With a 6 volt potential across resistor 115 and with network 90 fully unbalanced to provide a negative 8 volt signal, a positive 12 volt unbalance of network 120 will be sufficient to cause valve 16 to be driven to a ⅔ closed position, a 4 volt negative signal from network 160 being sufficient, when added to the negative 8 volts of network 90, to balance out the positive signal of network 120. When knob 113 is adjusted to its extreme right, and a maximum voltage of about 10 volts is impressed on resistor 115, a positive 12 volt unbalance of network 120 will be able to close valve 16 only if network 90 is within 2 volts of being balanced. When knob 113 is turned to its extreme left adjustment, so that about 2 volts may be impressed across resistor 115, a positive 10 volt unbalance of network 120 will be able to completely close valve 16 even though network 90 is unbalanced to the extent of its full 8 volts in a direction tending to cause opening of said valve. It is noted that the values above given are only suggestive and are made for the purpose of making the present description more understandable.

With the parts in the position shown, starting with terminal 44 through wire 168 to wiper 116, it is noted that wiper 116 is at the left of resistor 115 and therefore is in connection with wire 162, which in turn connects to wire 161 and wiper 97. Therefore there is no voltage signal from network 160. As both wipers 97 and 81 are in equal and extreme left positions, there is no voltage change or signal existing across network 90. Further, from wiper 81 to wire 140 and center tap 123 of network 120, there is no voltage difference, and as network 120 may be considered balanced due to no air flow through conduit 62, there is balance and thus no potential between output terminals 123 and 124 of said network. As output terminal 124 of network 120 connects to terminal 45 of amplifier 35, it is noted that there is no voltage signal of any sort impressed upon terminals 44 and 45, therefore motor 18 is at rest with valve 16 in a wide open position.

Let it now be assumed that the aircraft has taken off from an airfield at near sea level and is climbing at a relatively high rate and knob 102 of altitude selector 100 is adjusted for a cabin pressure corresponding to a 5,000 feet elevation, thus moving wiper 97 to the midpoint of resistor 96. With network 120 substantially balanced, with wiper 116 at the left end of resistor 115, and with the aircraft cabin pressure at substantially sea level value, it is noted that the signal impressed on amplifier 37 is 4 volts negative, thereby tending to cause operation of motor 18 in a direction to open valve 16 which, however, is already wide open. The open valve 16 causes cabin pressure to be substantially equal to atmospheric pressure because of the relatively free flow between the cabin and the atmosphere. As a result, when the aircraft is climbing at a relatively high rate, the cabin pressure tends to change more rapidly than desired. As the rate of change of cabin pressure increases, network 120 becomes unbalanced due to air flow through orifice 64 cooling resistor 66 more than resistor 65 and thus provides an increasingly large positive signal proportional to the rate of said air flow. This signal may reach a value of 12 volts, let it be assumed, at a moderate rate of cabin pressure change. Assuming that wiper 81 has moved a little, corresponding to about a 1 volt change, to the right on resistor 82 due to decrease in cabin pressure, and with wiper 97 at its midpoint of resistor 96, the signal output of network 90 would appear to be about negative 3 volts. With a negative 3 volts signal from network 90 and a positive 12 volt signal from network 120, there is a positive signal impressed on amplifier 37 which will cause operation of valve 16 toward a closed position and to cause wiper 116 to be moved to the right across resistor 115. As the valve is being closed, the rate of change of pressure is decreased, thereby decreasing the positive signal. Then as the cabin pressure approaches the selected value (5,000 feet in this case), wiper 81 is moved further to the right and diminishes the value of the negative signal from network 90. As the negative signal from network 90 is diminished, it is noted that less positive signal, or unbalance, is required in network 120 to dominate the control of valve 16. As a result, the rate of change of cabin pressure is lowered as the cabin pressure approaches the desired value. This is believed to be good practice from the standpoint of the passengers because the transition from a program of changing pressure to a stabilized pressure is gradual. Further, the desired cabin pressure can be held quite closely to its desired value due to the assisting effect of the rate of change responsive means, as will be seen. Without the rate of change responsive means, the valve 16 would remain wide open until the desired pressure was reached and would not start throttling the valve until said desired pressure, in terms of altitude, was exceeded. Because of the open valve, the cabin pressure would then have changed at the same rate and in accordance with the airplane's change in altitude.

When the aircraft reaches its cruising altitude at, say, 10,000 feet elevation, and the cabin pressure reaches its selected 5,000 feet of altitude pressure, wiper 81 is then in alignment with wiper 97 and the signal voltage from network 90 is again zero. Also, as the cabin pressure reaches the pre-selected value, the rate of flow of air from the reservoir 61 to cabin 10 diminishes to a negligible value and network 120 is no longer appreciably unbalanced. As the positive signal from network 120 approaches zero, and the negative signal from network 90 tends to become positive due to the system droop, the negative signal of network 160 is varied in accordance with valve position to balance said positive signal from network 90.

If the cabin pressure decreases below the related value, wiper 81 moves to the right of wiper 97 and, by virtue of its positive signal, causes a closing movement of the valve. However, if this change in pressure should occur suddenly, then air from reservoir 61 flows through 64 to cabin 10 and causes an additional positive signal tending to further close the valve. Thus, any variation in cabin pressure from the intended control point is immediately counteracted by the joint effect of the cabin pressure responsive means and the rate of change of pressure means. Because of said joint effect, a desired pressure can be maintained within closer limits than would otherwise be feasible.

Consider now that the aircraft is at a relatively high elevation, the cabin pressure is at a value corresponding to 5,000 foot altitude, and it is intended to land the aircraft at an airfield of 1,000 foot elevation. Considering the same moderate rate of pressure change as still desirable, no adjustment is made of knob 78, but knob 102 is turned counterclockwise to move wiper 97 to the left, said knob being turned to a position, indicating 1,000 foot elevation (elevation of the field). This change should be made sufficiently long before the intended landing time so that the cabin pressure can be built up to a value corresponding to a 1,000 foot elevation by the time the aircraft has landed. With network 120 balanced, wiper 81 at an intermediate position on resistor 82, and with wiper 97 adjusted to the left of wiper 81, a positive signal tends to be impressed on amplifier 37. This tends to cause a closing movement of valve 16 so that wiper 116 must move sufficiently far across resistor 115 to add enough negative signal to offset the positive signal from network 90. Closing valve 16 tends to increase cabin pressure. However, as cabin pressure is increased above that existing in reservoir 61, air flow takes place between cabin and said reservoir through orifice 64. Resistor 65 of network 120, being downstream of orifice 64 is cooled and its resistance lowered in the same fashion as before related in describing the action of resistor 66. Lowering the resistance of resistor 65 unbalances network 120 in a direction providing a negative signal. The negative signal from network 120 tends to offset the positive signal from network 90 and thereby modifies the positioning of valve 16, by cancelling out a portion of the signal calling for a closed valve. When the rate of change of cabin pressure drops sufficiently, the amount of unbalance in network 120 is lessened and the unbalance of network 90 again attempts to direct the closing movement of valve 16. Network 90 will continue to have a positive signal output as long as wiper 81 remains to the right of wiper 97 and therefore requires a partially closed position of valve 16 to balance the network. However, whenever the rate of change of pressure in the cabin approaches the intended limit, the unbalance in network 120 operates to open the valve and thus decrease the rate of change of pressure. It is noted that without network 120, an adjustment of altitude selector 100 to a lower altitude value of cabin pressure would result in an immediate closing of valve 16 and would keep same closed until the desired pressure was exceeded. However, with network 120, the rate of change of cabin pressure is kept within desired limits. It is further noted that as the positive voltage unbalance of network 90 is lessened as the desired pressure is approached, a smaller negative voltage unbalance of network 120 is required to dominate the position of valve 16, thereby slowing the rate of change of cabin pressure as the desired value is approached.

While the unbalance of network 120, the positioning of wiper 81 by pressure responsive means 80, and the positioning of valve 16 by motor 18 have been discussed somewhat sequentially in their operating effect, it is noted that in practice the various parts are in a substantially constant state of change whenever the plane is shifting in altitude. The compounded network constantly tends to become unbalanced and motor 18 is in almost constant operation adjusting valve 16 and follow-up potentiometer 22 to rebalance any unbalance of said network.

The present described system is seen to be effective in maintaining a desired cabin pressure, and is highly effective in controlling changes of the cabin pressure to a desired value at a controlled rate. The means used for control of rate of change of pressure is simple and trouble free and provides signals of an electrical nature which are easily coordinated in a network comprising other control apparatus. While the present apparatus has been described as using impedances of the resistor sort, it is obvious that other sorts of impedances may be used. The fact that the present rate of change of pressure responsive means is so ideally adapted to its present use should not be construed as limiting the present invention to use of only the disclosed sort of pressure change responsive means. It is contemplated that any suitable rate of change of pressure or differential flow responsive means capable of giving an electrical signal may be used with the present apparatus. In this, as in other features, many substitutions and equivalents will come to mind, therefore it is intended that the scope of the present invention be determined only by the appended claims.

I claim:

1. Cabin pressure control means comprising, in combination; means for varying the cabin pressure; means responsive to cabin pressure for controlling said varying means in a manner to maintain a predetermined pressure in said cabin; manually operable means for determining said predetermined pressure; reservoir means; conduit means for connecting said reservoir means in restricted fluid flow relation to said cabin; means responsive to fluid flow in said conduit; and means connecting said fluid flow responsive means in operative relation to said varying means, said cabin pressure responsive means and said manually operable means in such manner that said flow responsive means may oppose the action of said manually operable means to thereby limit the rate of change of cabin pressure.

2. In an aircraft, an enclosed compartment, means for supplying air to said compartment under pressure, means for limiting the rate of supply of air to said compartment, outlet means permitting the exhausting of air from said enclosure, said outlet means including motor driven valve means for controlling said outlet; and control means for said motor including a receptacle connected by conduit means with said compartment, means responsive to air flow through said conduit means, means responsive to cabin pressure, manually adjustable means for varying the control point of said cabin pressure responsive means, and means connecting said air flow responsive means, said pressure responsive means and said manually adjustable means in controlling relation to said motor in such manner that said air flow responsive means tends to oppose any change in cabin pressure.

3. In apparatus for an aircraft having a supercharged cabin, electrically controlled means for varying the pressure in said cabin, an enclosed receptacle, conduit means connecting said receptacle in fluid flow relation to said cabin, means restricting fluid flow through said conduit to a relatively small orifice, heated temperature responsive impedance means disposed on opposite sides of said orifice and in substantial alignment therewith, and means responsive to differences in impedance between said temperature responsive means for controlling said electrically controlled varying means in a manner to lessen said temperature differences.

4. In control apparatus; means for controlling a condition changing medium; a follow-up electrical network providing electrical signals in accordance with the operating relation of said controlling means; a second electrical network including means responsive to manual adjustment and means responsive to said condition, said second network providing electrical signals in accordance with the difference between the manual adjustments and the means responsive to the condition; and a third electrical network including a pair of temperature responsive impedance means arranged to respond to changes in the said condition, said third network providing electrical signals in accordance with the differences in impedance of said temperature responsive means, said follow-up network, the second network and the third network being connected in series and in controlling relation to said means for controlling a condition changing medium.

5. In aircraft cabin pressure control apparatus, means responsive to cabin pressure, impedance means adjustable by said cabin pressure responsive means, means for varying the cabin pressure relative to atmospheric pressure, means responsive to the rate of change of cabin pressure including additional impedance means, and an electrical network circuit connecting said impedance means and said additional impedance means in controlling relation to said pressure varying means.

6. In aircraft cabin pressure control apparatus, means responsive to cabin pressure, impedance means adjustable by said cabin pressure responsive means, means for varying the cabin pressure relative to atmospheric pressure, fluid conduit means, means causing air motion in said conduit means in accordance with changes in cabin pressure, additional impedance means arranged to be adjusted in accordance with said air motion, and electrical network circuit means connecting said impedance means and said additional impedance means in controlling relation to said varying means.

7. In a structure having an enclosure supplied with air under pressure, air flow control means for varying the air pressure within the enclosure, manually adjustable electric circuit means for regulating said flow control means, reservoir means in fluid flow relationship to said enclosure, hot-wire means responsive to fluid flow between said enclosure and said reservoir, and means connecting said hot wire means into said circuit means for regulating said flow control means in direct opposition to said manually adjustable means.

8. Cabin pressure control means comprising, in combination, electrically controlled means for varying the cabin pressure, means responsive to cabin pressure and including an electrical circuit for controlling said varying means in a manner to maintain a predetermined pressure in said cabin, manually adjustable impedance means for determining the value of said predetermined pressure, and impedance means responsive to the rate of change of said cabin pressure for variably opposing said manually adjustable impedance means to thereby limit the rate of change of cabin pressure.

9. An aircraft cabin pressure control system comprising, in combination; motor operated valve means for controlling the cabin pressure; cabin pressure responsive means; impedance means adjustable by said responsive means; manually adjustable impedance means; pressure change responsive means comprising a pair of heated temperature responsive means arranged to be unequally cooled upon changes in cabin pressure; and a network circuit connecting the impedance means adjustable by cabin pressure, the manually adjustable impedance means and the pair of heated impedance means in controlling relation to the motor of said valve means in such manner that a difference in temperature between said heated impedance means tends to oppose any change in cabin pressure.

GEORGE L. BORELL.

REFERENCES CITED

The following references are of record in the file of this patent:

UNITED STATES PATENTS

| Number | Name | Date |
| --- | --- | --- |
| 1,525,463 | Packard | Feb. 10, 1925 |
| 2,194,749 | Gregg | Mar. 26, 1940 |
| 2,214,181 | Rylsky | Sept. 10, 1940 |
| 2,284,984 | Nixon et al. | June 2, 1942 |
| 2,307,199 | Cooper | Jan. 5, 1943 |
| 2,342,220 | Price | Feb. 22, 1944 |
| 2,391,197 | Schwien | Dec. 18, 1945 |
| 2,396,116 | Noxon | Mar. 5, 1946 |
| 2,413,027 | Maxson | Dec. 24, 1946 |
| 2,419,707 | Cooper et al. | Apr. 29, 1947 |

FOREIGN PATENTS

| Number | Country | Date |
| --- | --- | --- |
| 521,623 | Great Britain | May 27, 1940 |

OTHER REFERENCES

"Pressurized Cabin Control," Tinker and Hubbard, "Aviation," Jan. 1941, pp. 38, 119, 124.